April 22, 1924.

R. O. BERG

METHOD OF TUBE WELDING

Filed March 31, 1922

1,491,128

Inventor
Richard O. Berg
By Stuart C. Barnes
Attorney

Patented Apr. 22, 1924.

1,491,128

UNITED STATES PATENT OFFICE.

RICHARD O. BERG, OF DETROIT, MICHIGAN, ASSIGNOR TO MICHIGAN STEEL TUBE PRODUCTS COMPANY, OF DETROIT, MICHIGAN, A CORPORATION OF MICHIGAN.

METHOD OF TUBE WELDING.

Application filed March 31, 1922. Serial No. 548,292.

*To all whom it may concern:*

Be it known that RICHARD O. BERG, a citizen of the United States, residing at Detroit, in the county of Wayne and State of Michigan, has invented certain new and useful Improvements in Methods of Tube Welding, of which the following is a specification.

This invention relates to tube welding and has for its object a new method of welding tube.

A common way of welding tube is to use a line of oxy-acetylene jets which are arranged to strike the seam at the center. This form of welding oftentimes results in blowing through the tube and also causes a bad burr on the inside. Still another form of welding, which has been found to give satisfactory results is to use two lines of jets, which span the seam, the jets strike the edges of the tube slightly to the inside thereof and consequently are not nearly so likely to blow through. This form of welding, however, requires considerable use of oxyacetylene gas.

It is the object of the present method to provide a method of welding which avoids blowing through the tube, yet at the same time is economical in the use of gas, resulting in considerable saving over the two line jet form of welding.

Figure 1:
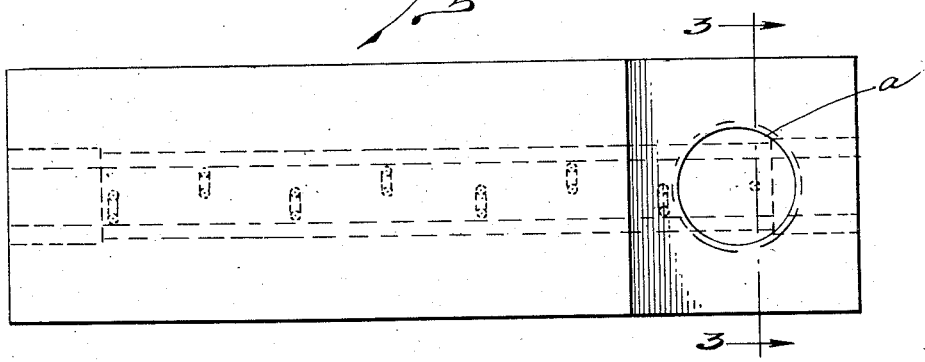
Fig. 1 is a plan view of the tip by which the method is carried out.

Referring to Fig. 1, *a* designates the opening through which the tip stud is passed and secured in place. This tip stud is provided with suitable mixing passageways to commingle oxygen and acetylene gases in a familiar way. The stud is not shown as it is well known construction in the art.

Figure 2:
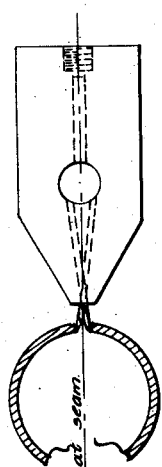
Fig. 2 is an end elevation of the tip.
Figure 4:
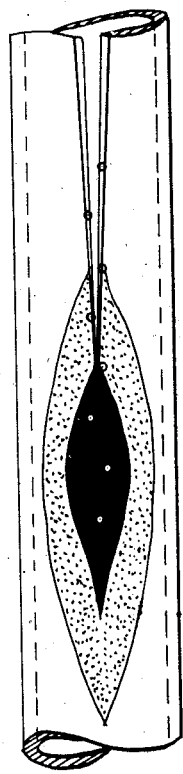
Fig. 4 is a plan view of the tube undergoing welding.
Figure 3:
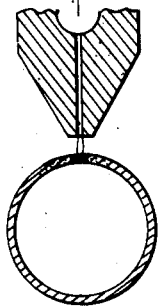
Fig. 3 is a cross section on the line 3—3.

A comparison of Figs. 2 and 4 will show the method of welding which is the subject of the present application. The tip itself which is only one specific way in which the method may be carried out, is made the subject of a co-pending application. The holes in this tip are drilled on oblique lines, one being disposed at an angle to the perpendicular through the tip tube at the center of the seam and the next one at an angle to such perpendicular on the opposite side of the perpendicular. In other words the jet openings or passageways are directed alternately and obliquely, first to one side and then to the other. These passageways might be each contained in a separate tip with a separate mixing chamber, hence the method is entirely separate from the tip, which is claimed in the copending application.

By referring to Fig. 4, the advantage of this method will be seen. The preheating jets, which may be said to be the first four jets at the top of the tube as shown in Fig. 4, strike the faces of the edges of the tube. The faces of the edges of the tube will not be on strictly radial lines, but will tip at somewhat of an angle thereto, hence the faces of the edges will appear somewhat as shown in Fig. 4, to one viewing the same from the top of the tube. The jets being tipped, as shown in Fig. 2, will play upon such faces at an angle it is true, but at an angle which will approach an angle of 45 degrees to the perpendicular. This will result in heating the edges better, due to a more direct strike than is ordinary the case and will also heat the tube effectively clear through. In this preliminary heating no objection results from so directing the jets that they go through the tube, as the metal does not here become molten.

The welding rolls are so adjusted that they are calculated to bring the edges of the tube together as shown in Fig. 4 at the point where the metal actually becomes molten. Molten metal is shown in the black patch in Fig. 4. The result is that where the jets strike the faces of the edges of the tube, the force of the jet blowing through does no harm because the metal is simply being heated up to a red heat, but has not yet become molten. At the point where the metal begins to run the welding and feeding rolls are so adjusted as to cause the edges to contact, consequently the obliquely directed jets strike the metal to the inside of the meeting edges so that they do not tend to blow through the very center of the same, which is the weakest point. Striking the metal at the sides of the edges they sort of puddle or flow the metal in towards the center causing a slight ridge at the center. The last jet strikes the tube directly in the center of the seam, leveling this ridge and thereby avoiding an objectionable burr on the outside of the tube.

We find that this method of welding is very effective especially with large sized tubing, where the tube is fairly thick and the exposed faces of the opposing edges are some width; economical operation results in the way of saving gas, and a very good weld is effected, because the preliminary heating heats the edges of the tube clear through due to striking the edges at an angle that somewhat approaches a direct or perpendicular strike.

What we claim is:

The method of welding which comprises the causing of the tube blank to travel longitudinally and directing the flame jets to alternately strike the up-turned faces of the exposed edges of the tube on opposite sides of the same, the said method being practised with a relatively long line of jets.

In testimony whereof I affix my signature.

RICHARD O. BERG.